US010684026B2

(12) United States Patent
Fukuhara et al.

(10) Patent No.: US 10,684,026 B2
(45) Date of Patent: Jun. 16, 2020

(54) DEHUMIDIFYING APPARATUS

(71) Applicant: Mitsubishi Electric Corporation, Tokyo (JP)

(72) Inventors: Keizo Fukuhara, Tokyo (JP); Keigo Okajima, Tokyo (JP); Manabu Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 15/779,621

(22) PCT Filed: Jan. 27, 2016

(86) PCT No.: PCT/JP2016/052316
§ 371 (c)(1),
(2) Date: May 29, 2018

(87) PCT Pub. No.: WO2017/130322
PCT Pub. Date: Aug. 3, 2017

(65) Prior Publication Data
US 2018/0372348 A1 Dec. 27, 2018

(51) Int. Cl.
F24F 3/14 (2006.01)
B01D 53/04 (2006.01)
(Continued)

(52) U.S. Cl.
CPC ........ F24F 3/1429 (2013.01); B01D 53/0407 (2013.01); B01D 53/261 (2013.01);
(Continued)

(58) Field of Classification Search
CPC ........ F24F 3/1429; F24F 3/1417; F24F 11/41; F24F 2110/20; F24F 2003/144; B01D 53/261; B01D 53/0407
See application file for complete search history.

(56) References Cited

U.S. PATENT DOCUMENTS

2016/0061475 A1    3/2016   Ito et al.

FOREIGN PATENT DOCUMENTS

GB    2525112 A    10/2015
JP    2001-304783 A    10/2001
(Continued)

OTHER PUBLICATIONS

International Search Report of the International Searching Authority dated Apr. 12, 2016 for the corresponding international application No. PCT/JP2016/052316 (and English translation).
(Continued)

Primary Examiner — Ana M Vazquez
(74) Attorney, Agent, or Firm — Posz Law Group, PLC

(57) ABSTRACT

A dehumidifying apparatus includes first, second, and third heat exchangers; moisture adsorbing material; a fan to force air through the first heat exchanger, the moisture adsorbing material, the second heat exchanger, and the third heat exchanger; a compressor having a discharge side connected to the third heat exchanger; and an expansion valve configured to reduce the pressure of a refrigerant condensed by the first heat exchanger or the second heat exchanger. The third heat exchanger has a fin pitch smaller than a fin pitch of the first heat exchanger and a fin pitch of the second heat exchanger. The third heat exchanger is smaller than the first heat exchanger and the second heat exchanger. This arrangement provides a small, low-cost dehumidifying apparatus.

3 Claims, 6 Drawing Sheets

(51) Int. Cl.
    *B01D 53/26*     (2006.01)
    *F24F 110/20*     (2018.01)
    *F24F 11/41*     (2018.01)
    *F24F 3/153*     (2006.01)

(52) U.S. Cl.
    CPC .......... *F24F 3/1417* (2013.01); *F24F 3/153* (2013.01); *F24F 11/41* (2018.01); *B01D 2253/102* (2013.01); *B01D 2253/106* (2013.01); *B01D 2253/108* (2013.01); *B01D 2253/202* (2013.01); *B01D 2257/80* (2013.01); *F24F 2003/144* (2013.01); *F24F 2110/20* (2018.01); *F24F 2203/021* (2013.01)

(56) References Cited

FOREIGN PATENT DOCUMENTS

| | | | |
|---|---|---|---|
| JP | 4649967 B2 | 6/2006 | |
| WO | 2006/051800 A1 | 5/2006 | |
| WO | 2011/096124 A1 | 8/2011 | |
| WO | 2014/118871 A1 | 8/2014 | |
| WO | WO-2014118871 A1 * | 8/2014 | ............. F24F 11/89 |
| WO | 2014/174623 A1 | 10/2014 | |

OTHER PUBLICATIONS

Office action dated Jun. 25, 2019 issued in corresponding JP patent application No. 2017-563453 (and English translation thereof).

\* cited by examiner

DEHUMIDIFYING APPARATUS

CROSS REFERENCE TO RELATED APPLICATION

This application is a U.S. national stage application of PCT/JP2016/052316 filed on Jan. 27, 2016, the contents of which are incorporated herein by reference.

TECHNICAL FIELD

The present invention relates to a dehumidifying apparatus combining desiccant and a heat pump.

BACKGROUND ART

In the past, there have been dehumidifying apparatuses combining a heat pump and desiccant that adsorbs and desorbs moisture. As one of such dehumidifying apparatuses, a dehumidifying apparatus has been proposed in which an air passage is divided to allow airflows having different relative humidity values to pass through a rotor-shaped desiccant material, which is rotated to repeat adsorption reaction and desorption reaction (see Patent Literature 1, for example). Further, at a low temperature (10 degrees Celsius, for example), the dehumidifying apparatus described in Patent Literature 1 allows air heated with a heater to flow into the desiccant material to facilitate the release of moisture. This configuration increases the humidity and the amount of humidification, and the heated air passes through an evaporator, thereby increasing the evaporating temperature and suppressing frost formation on a heat exchanger.

CITATION LIST

Patent Literature

Patent Literature 1: Japanese Patent No. 4649967

SUMMARY OF INVENTION

Technical Problem

The foregoing dehumidifying apparatus described in Patent Literature 1 is capable of suppressing frost formation. If the temperature further decreases (to 5 degrees Celsius, for example), however, the capacity of the heater is insufficient, allowing low-temperature air to flow into the evaporator. When outside air is at such a low temperature, therefore, frost formation eventually occurs.

Further, when frost formation occurs in the foregoing dehumidifying apparatus described in Patent Literature 1, defrosting through heating with the heater is necessary. The defrosting with the heater, however, involves issues such as an increase in power consumption and humidification of ambient air during the defrosting.

Further, in Patent Literature 1 described above, most of the heat of condensation generated in a refrigeration cycle is directly discharged, not being usable as a heat source available for defrosting.

The present invention has been made to address at least one of the issues as described above, and aims to provide a small, low-cost dehumidifying apparatus by clarifying the respective purposes of heat exchangers and optimizing the sizes of the heat exchangers.

Solution to Problem

A dehumidifying apparatus according to an embodiment of the present invention includes a first heat exchanger disposed in an air passage to serve as a condenser or an evaporator; a second heat exchanger disposed in the air passage to serve as an evaporator or a condenser; a third heat exchanger disposed in the air passage to serve as a condenser; a moisture adsorbing unit disposed between the first heat exchanger and the second heat exchanger in the air passage to adsorb moisture from air having high relative humidity and desorb moisture to air having low relative humidity; an air sending unit configured to cause air to pass through the first heat exchanger, the moisture adsorbing unit, the second heat exchanger, and the third heat exchanger in a named order; a compressor having a discharge side connected to the third heat exchanger; and an expansion unit configured to reduce pressure of refrigerant condensed by the first heat exchanger or the second heat exchanger, wherein the third heat exchanger is configured to be smaller than at least one of the first heat exchanger and the second heat exchanger A dehumidifying apparatus according to an embodiment of the present invention includes a first heat exchanger disposed in an air passage to serve as an evaporator; a second heat exchanger disposed in the air passage to serve as a condenser; a third heat exchanger disposed in the air passage to serve as a condenser; a moisture adsorbing unit disposed between the first heat exchanger and the second heat exchanger in the air passage to adsorb moisture from air having high relative humidity and desorb moisture to air having low relative humidity; an air sending unit configured to cause air to pass through the first heat exchanger, the moisture adsorbing unit, the second heat exchanger, and the third heat exchanger in a named order, or to cause air to pass through the second heat exchanger, the moisture adsorbing unit, the first heat exchanger, and the third heat exchanger in a named order; a compressor having a discharge side connected to the third heat exchanger; and an expansion unit configured to reduce pressure of refrigerant condensed by the third heat exchanger and the second heat exchanger, wherein at least one of the third heat exchanger and the second heat exchanger is configured to be smaller than the first heat exchanger.

Advantageous Effects of Invention

According to the dehumidifying apparatuses of the embodiments of the present invention, the third heat exchanger constantly serves as a condenser. Therefore, frost formation does not occur in the third heat exchanger even in a low-temperature environment, thereby obviating the need to take into account the maintenance of performance in a frosted state. Accordingly, it is possible to optimize the size of the heat exchanger and realize a reduction in size and cost.

DESCRIPTION OF EMBODIMENTS

Embodiments 1 and 2 of this invention will be described below based on the drawings. In the following drawings including FIG. 1, the dimensional relationships between component members may be different from actual ones. Further, in the following drawings including FIG. 1, parts assigned with identical reference signs are identical or correspond to each other, which applies throughout the specification. Further, the forms of component elements described throughout the text of the specification are basically illustrative, and the forms of component elements are not limited to those described ones.

Embodiment 1

Figure 1:
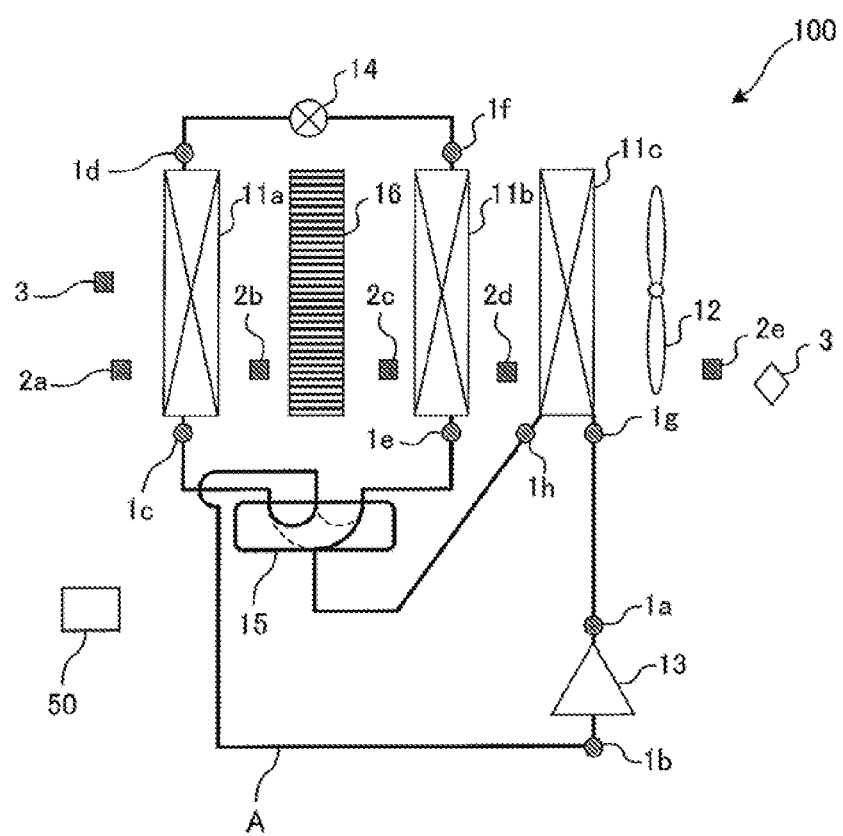
FIG. 1 is a schematic configuration diagram illustrating an example of the configuration of a dehumidifying apparatus according to Embodiment 1 of the present invention.
Figure 2:
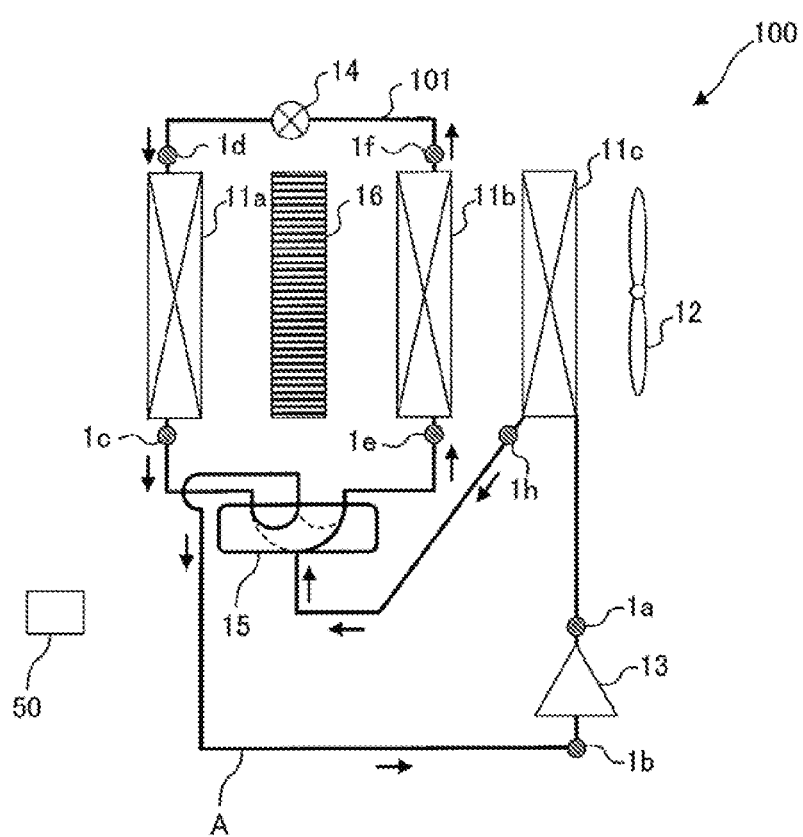
FIG. 2 is a schematic circuit diagram illustrating a refrigerant circulation path of the dehumidifying apparatus according to Embodiment 1 of the present invention in a first operation mode.
Figure 3:
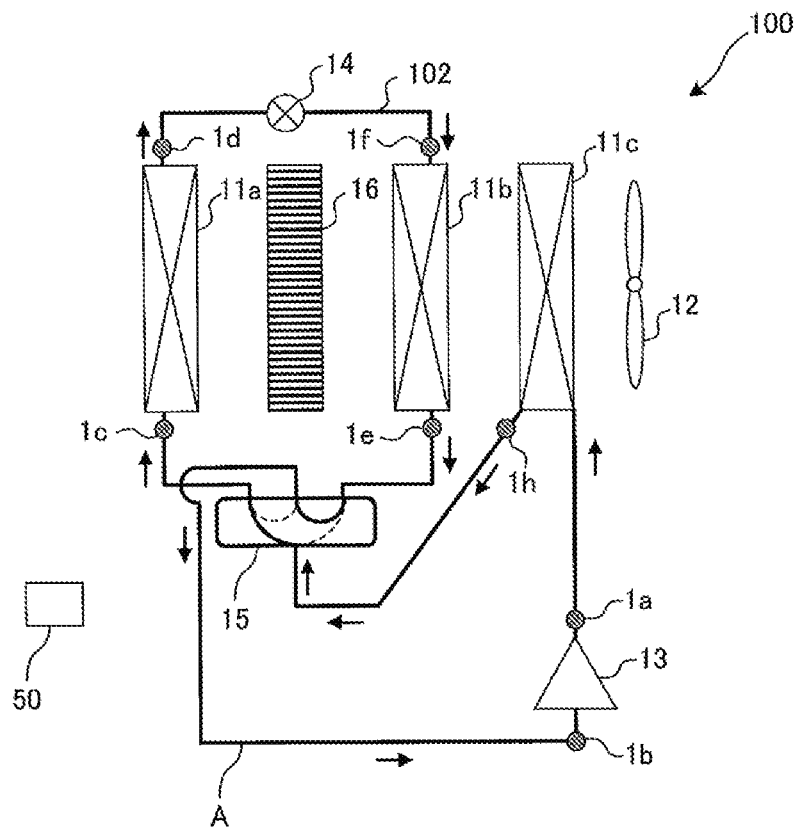
FIG. 3 is a schematic circuit diagram illustrating a refrigerant circulation path of the dehumidifying apparatus according to Embodiment 1 of the present invention in a second operation mode.
Figure 4:
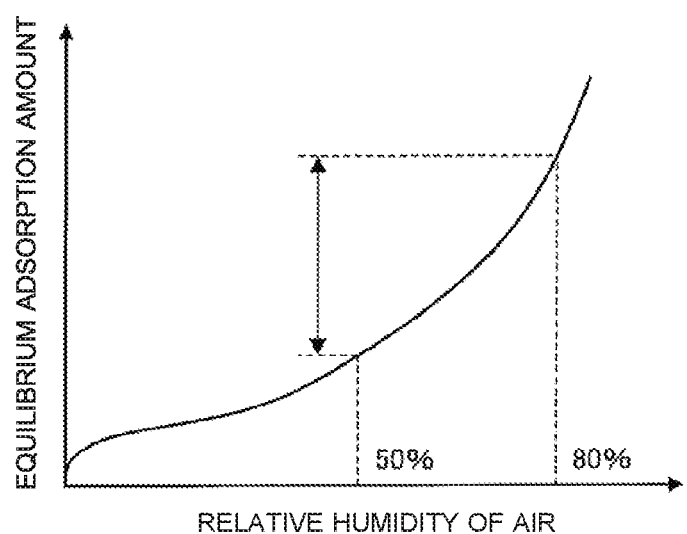
FIG. 4 is an adsorption isotherm graph illustrating changes in a saturated moisture adsorption amount relative to relative humidity of a moisture adsorbing unit included in the dehumidifying apparatus according to Embodiment 1 of the present invention.

FIG. 1 is a schematic configuration diagram illustrating an example of the configuration of a dehumidifying apparatus 100 according to Embodiment 1 of the present invention. FIG. 2 is a schematic circuit diagram illustrating a refrigerant circulation path of the dehumidifying apparatus 100 in a first operation mode. FIG. 3 is a schematic circuit diagram illustrating a refrigerant circulation path of the dehumidifying apparatus 100 in a second operation mode. FIG. 4 is an adsorption isotherm graph illustrating changes in a saturated moisture adsorption amount relative to relative humidity of a moisture adsorbing unit included in the dehumidifying apparatus 100. The dehumidifying apparatus 100 will be described based on FIGS. 1 to 4.

<<Configuration of Air Passage of Dehumidifying Apparatus 100>>

Air to be dehumidified by the dehumidifying apparatus 100 passes through a first heat exchanger 11a, a moisture adsorbing unit 16, a second heat exchanger 11b, and a third heat exchanger 11c, and thereafter is discharged into a dehumidification target space by an air sending unit 12. The air sending unit 12 is disposed on the most downstream side of the air passage in FIG. 1, but may be disposed on the most upstream side of the air passage as long as a target amount of air passes through the first to third heat exchangers 11a to 11c and the moisture adsorbing unit 16. The disposition position of the air sending unit 12 is not limited to the illustrated position.

Sensors disposed in the air passage will be described.

Each of thermo-hygro sensors 2a to 2e detects one of dry-bulb temperature, relative humidity, dew-point temperature, absolute temperature, and wet-bulb temperature in the air passage.

The thermo-hygro sensor 2a detects the temperature and humidity of the air to be dehumidified.

The thermo-hygro sensor 2b detects the temperature and humidity of the air having passed through the first heat exchanger 11a.

The thermo-hygro sensor 2c detects the temperature and humidity of the air having passed through the moisture adsorbing unit 16.

The thermo-hygro sensor 2d detects the temperature and humidity of the air having passed through the second heat exchanger 11b.

The thermo-hygro sensor 2e detects the temperature and humidity of the air having passed through the third heat exchanger 11c.

The thermo-hygro sensors 2a to 2e may be installed as necessary, and are not necessarily required to be installed. Further, the installation locations of the thermo-hygro sensors 2a to 2e are not particularly limited.

Further, an air amount detecting unit 3 is disposed in the air passage.

The air amount detecting unit 3 detects the amount of air passing through the air passage. The disposition position of the air amount detecting unit 3 may be any disposition position enabling the air amount detecting unit 3 to detect the amount of air passing through the air passage, and is not particularly limited.

The thermo-hygro sensors 2a to 2e and the air amount detecting unit 3 are disposed in the air passage of the dehumidifying apparatus 100.

The thermo-hygro sensor 2a is disposed at an inlet portion of the air passage of the dehumidifying apparatus 100.

The thermo-hygro sensor 2b is disposed at a position past the first heat exchanger 11a.

The thermo-hygro sensor 2c is disposed at a position past the moisture adsorbing unit 16.

The thermo-hygro sensor 2d is disposed at a position past the second heat exchanger 11b.

The thermo-hygro sensor 2e is disposed at a position past the third heat exchanger 11c.

<<Configuration of Refrigerant Circuit of Dehumidifying Apparatus 100>>

The dehumidifying apparatus 100 includes a refrigerant circuit A. The refrigerant circuit A is formed of a compressor 13, the first heat exchanger 11a, the second heat exchanger 11b, the third heat exchanger 11c, an expansion unit 14, and a four-way valve 15 connected by pipes. The compressor 13 compresses refrigerant. The first heat exchanger 11a and the second heat exchanger 11b each serve as a condenser that condenses the refrigerant or as an evaporator that evaporates the refrigerant. The third heat exchanger 11c constantly serves as a condenser that condenses the refrigerant. The expansion unit 14 reduces the pressure of the condensed refrigerant. The four-way valve 15 reverses flows of the refrigerant flowing into the first heat exchanger 11a and the second heat exchanger 11b.

The dehumidifying apparatus 100 has two operation modes in accordance with the switching of the four-way valve 15.

In a first operation mode, a refrigerant passage (a refrigerant passage 101 indicated by a solid line in FIG. 2) is formed in which the refrigerant sequentially flows through the compressor 13, the third heat exchanger 11c, the four-way valve 15, the second heat exchanger 11b, the expansion unit 14, the first heat exchanger 11a, and the four-way valve 15, and flows back into the compressor 13.

In a second operation mode, a refrigerant passage (a refrigerant passage 102 indicated by a solid line in FIG. 3) is formed in which the refrigerant sequentially flows through the compressor 13, the third heat exchanger 11c, the four-way valve 15, the first heat exchanger 11a, the expansion unit 14, the second heat exchanger 11b, and the four-way valve 15, and flows back into the compressor 13.

(Compressor 13)

The compressor 13 is a volumetric compressor driven by a motor (not illustrated). The number of the compressors 13 provided in the apparatus is not limited to one, and two or more compressors may be provided as connected in parallel or in series.

(First to Third Heat Exchangers 11a to 11c)

Each of the first to third heat exchangers 11a to 11c is a cross-fin, fin-and-tube heat exchanger formed of a heat transfer tube and multiple fins. Further, the connection of refrigerant pipes of the first to third heat exchangers 11a to 11c may either be serial connection or parallel connection as long as the connection enables switching between heating and cooling and adjustment of the amount of heating.

(Air Sending Unit 12)

The air sending unit 12 is a fan capable of changing the flow rate of air passing through the air passage of the dehumidifying apparatus 100. For example, the air sending unit 12 may preferably be formed of a centrifugal fan or a multi-blade fan driven by a motor such as a DC fan motor.

(Expansion Unit 14)

The expansion unit 14 may preferably be formed of a device capable of adjusting the flow rate of the refrigerant flowing through the refrigerant circuit A, for example. For instance, the expansion unit 14 may preferably be formed of an electronic expansion valve, an expansion opening degree of which is adjustable with a stepping motor (not illustrated), a mechanical expansion valve having a pressure receiving part employing a diaphragm, or a capillary tube.

(Four-Way Valve 15)

The four-way valve 15 is a valve for switching the direction of the refrigerant flowing through the first heat exchanger 11a and the second heat exchanger 11b. The four-way valve 15 corresponds to a "refrigerant circuit switching unit" of the present invention.

In the operation in the first operation mode, the four-way valve 15 forms a refrigerant circuit in which the refrigerant flows into the four-way valve 15 and thereafter sequentially flows into the second heat exchanger 11b, the expansion unit 14, the first heat exchanger 11a, and the four-way valve 15.

In the operation in the second operation mode, the four-way valve 15 forms a refrigerant circuit in which the refrigerant flow into the four-way valve 15 and thereafter sequentially flows into the first heat exchanger 11a, the expansion unit 14, the second heat exchanger 11b, and the four-way valve 15.

In Embodiment 1, the four-way valve 15 will be described as an example of the "refrigerant circuit switching unit." However, a device capable of selectively switching the refrigerant circuit, such as a combination of a plurality of solenoid valves, for example, may be used as the "refrigerant circuit switching unit."

(Moisture Adsorbing Unit 16)

The dehumidifying apparatus 100 includes the moisture adsorbing unit 16. Herein, to obtain a large ventilation cross section from an air passage cross section of the air passage of the dehumidifying apparatus 100, the moisture adsorbing unit 16 is formed of a flat porous plate having a polygonal shape (a rectangular, pentagonal, hexagonal, or octagonal shape, for example) or a circular shape along the cross section of the air passage, and is configured to allow air to pass therethrough in the thickness direction thereof.

Further, an adsorbent material having a characteristic of adsorbing moisture from air having relatively high humidity and releasing moisture to air having relatively low humidity, such as zeolite, silica gel, activated carbon, or a polymer adsorbent material, is used on a surface of the flat porous plate forming the moisture adsorbing unit 16, with the surface of the flat porous plate being coated, surface-treated, or impregnated with the adsorbent material.

FIG. 4 illustrates the amount of moisture absorbable by the adsorbent material used in the moisture adsorbing unit 16 (equilibrium adsorption amount) relative to the relative humidity of the air. In general, the equilibrium adsorption amount increases with an increase in the relative humidity of air. The dehumidifying apparatus 100 uses an adsorbent material having a large difference between the equilibrium adsorption amount thereof at relative humidity of 80% or higher and the equilibrium adsorption amount thereof at relative humidity of 40% to 60%. It is thereby possible to increase adsorption and desorption capacity of the moisture adsorbing unit 16.

(Refrigerant)

The refrigerant used in the refrigerant circuit A of the dehumidifying apparatus 100 may be HFC refrigerant such as R410A, R407C, or R404A, HCFC refrigerant such as R22 or R134a, or natural refrigerant such as hydrocarbon or helium, for example.

(Disposition of Sensors in Refrigerant Circuit A)

A plurality of sensors are disposed in the refrigerant circuit A of the dehumidifying apparatus 100.

A discharge temperature sensor 1a is provided on a discharge side of the compressor 13 to detect the temperature of the refrigerant discharged from the compressor 13.

A suction temperature sensor 1b is provided on a suction side of the compressor 13 to detect the temperature of the refrigerant to be suctioned into the compressor 13.

Temperature sensors 1c and 1d are provided on an inlet side and an outlet side of the first heat exchanger 11a to detect the temperature of the refrigerant flowing into the first heat exchanger 11a and the temperature of the refrigerant flowing from the first heat exchanger 11a.

Temperature sensors 1e and 1f are provided on an inlet side and an outlet side of the second heat exchanger 11b to detect the temperature of the refrigerant flowing into the second heat exchanger 11b and the temperature of the refrigerant flowing from the second heat exchanger 11b.

Temperature sensors 1g and 1h are provided on an inlet side and an outlet side of the third heat exchanger 11c to detect the temperature of the refrigerant flowing into the third heat exchanger 11c and the temperature of the refrigerant flowing from the third heat exchanger 11c.

The dehumidifying apparatus 100 further includes a not-illustrated counter 4 that detects a dehumidifying operation time. The dehumidifying apparatus 100 further includes a control circuit 50 that receives inputs of information of measurements by the discharge temperature sensor 1a, the suction temperature sensor 1b, the temperature sensors 1c to 1 h, the thermo-hygro sensors 2a to 2e, the air amount detecting unit 3, and the counter. The control circuit 50 controls a variety of actuators based on information from a variety of sensors to execute the following operation modes.

<<First Operation Mode: Refrigerant Passage (First Refrigerant Passage) 101>>

As described above, FIG. 2 is a schematic circuit diagram illustrating the refrigerant circulation path of the dehumidifying apparatus 100 in the first operation mode. Based on FIG. 2, a description will be given of movement of the refrigerant in the refrigerant passage 101 of the refrigerant circuit A of the dehumidifying apparatus 100 in the first operation mode.

In the first operation mode, the third heat exchanger 11c acts as a condenser, the second heat exchanger 11b acts as a condenser, and the first heat exchanger 11a acts as an evaporator.

The refrigerant compressed and discharged from the compressor 13 flows into the third heat exchanger 11c. The refrigerant flowing into the third heat exchanger 11c acting as a condenser is partially condensed and liquified while exchanging heat with air. The refrigerant passes through the third heat exchanger 11c, and thereafter passes through the four-way valve 15 and flows into the second heat exchanger 11b. The refrigerant flowing into the second heat exchanger 11b acting as a condenser is condensed and liquified while exchanging heat with air, and flows into the expansion unit 14. The refrigerant is reduced in pressure by the expansion unit 14, and thereafter flows into the first heat exchanger 11a. The refrigerant flowing into the first heat exchanger 11a acting as an evaporator evaporates through heat exchange with air, and thereafter passes through the four-way valve 15 and is suctioned back into the compressor 13.

<<Second Operation Mode: Refrigerant Passage 102>>

As described above, FIG. 3 is a schematic circuit diagram illustrating the refrigerant circulation path of the dehumidifying apparatus 100 in the second operation mode. Based on FIG. 3, a description will be given of movement of the refrigerant in the refrigerant passage 102 of the refrigerant circuit A of the dehumidifying apparatus 100 in the second operation mode.

In the second operation mode, the third heat exchanger 11c acts as a condenser, the second heat exchanger 11b acts as an evaporator, and the first heat exchanger 11a acts as a condenser.

The refrigerant compressed and discharged from the compressor 13 flows into the third heat exchanger 11c. The refrigerant flowing into the third heat exchanger 11c acting as a condenser is partially condensed and liquified while exchanging heat with air. The refrigerant passes through the third heat exchanger 11c, and thereafter passes through the four-way valve 15 and flows into the first heat exchanger 11a. The refrigerant flowing into the first heat exchanger 11a acting as a condenser is condensed and liquified while exchanging heat with air, and flows into the expansion unit 14. The refrigerant is reduced in pressure by the expansion unit 14, and thereafter flows into the second heat exchanger 11b. The refrigerant flowing into the second heat exchanger 11b acting as an evaporator evaporates through heat exchange with air, and thereafter passes through the four-way valve 15 and is suctioned back into the compressor 13.

Herein, a single heat exchanger does not form a condenser, but a plurality of heat exchangers form condensers. In the first operation mode, the second heat exchanger 11b and the third heat exchanger 11c are used as condensers. In the second operation mode, the first heat exchanger 11a and the third heat exchanger 11c are used as condensers. This is mainly for adjusting the temperature of the air flowing into the moisture adsorbing unit 16 in the second operation mode. That is, this is for preventing an excessive increase in the temperature of the air flowing into the moisture adsorbing unit 16 in the second operation mode. If the temperature of the air flowing into the moisture adsorbing unit 16 is excessively increased in the second operation mode, the amount of moisture discharged from the moisture adsorbing unit 16 is increased. This is for preventing a portion of the discharged moisture exceeding the capacity of the second heat exchanger 11b from being directly discharged into a dehumidification space and causing an inefficient operation.

<<Dehumidifying Operation of Dehumidifying Apparatus 100>>

Figure 5:
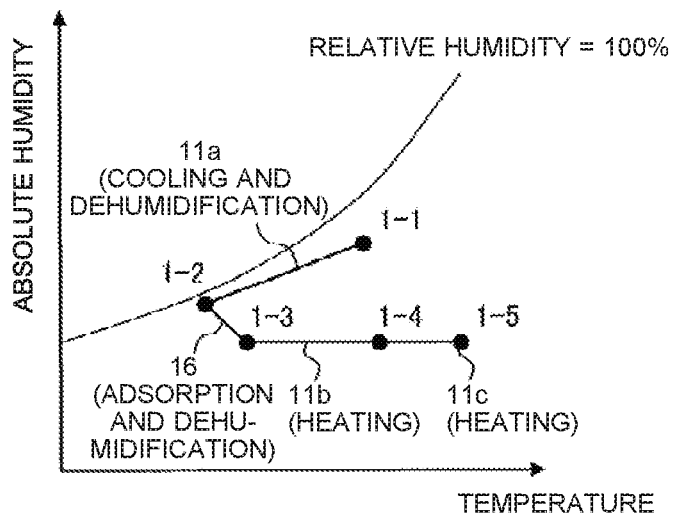
FIG. 5 is a moist air graph illustrating changes in the temperature and humidity of air in an air passage of the dehumidifying apparatus according to Embodiment 1 of the present invention in the first operation mode of the dehumidifying apparatus.
Figure 6:
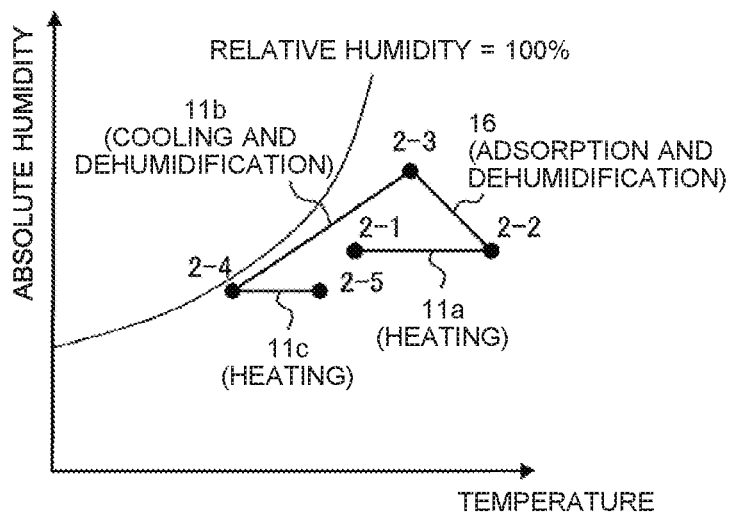
FIG. 6 is a moist air graph illustrating changes in the temperature and humidity of the air in the air passage of the dehumidifying apparatus according to Embodiment 1 of the present invention in the second operation mode of the dehumidifying apparatus.
Figure 7:
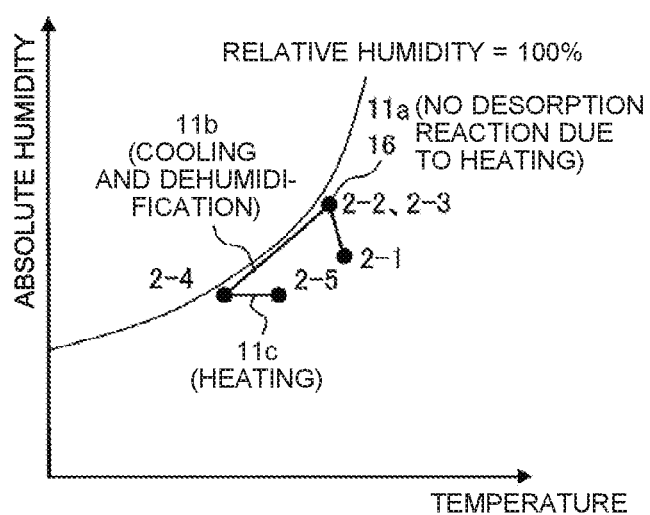
FIG. 7 is a moist air graph illustrating changes in the temperature and humidity of the air in the air passage of the dehumidifying apparatus according to Embodiment 1 of the present invention in the second operation mode of the dehumidifying apparatus.

Movements of air in the dehumidifying apparatus 100 in the respective operation modes will be described with FIGS. 5 to 7. FIG. 5 is a moist air graph illustrating changes in the temperature and humidity of the air in the air passage of the dehumidifying apparatus 100 in the first operation mode of the dehumidifying apparatus 100. FIG. 6 is a moist air graph illustrating changes in the temperature and humidity of the air in the air passage of the dehumidifying apparatus 100 in the second operation mode of the dehumidifying apparatus 100. FIG. 7 is a moist air graph illustrating changes in the temperature and humidity of the air in the air passage of the dehumidifying apparatus 100 in the second operation mode of the dehumidifying apparatus 100.

It is assumed herein that, in the first operation mode, the amount of moisture retained by the moisture adsorbing unit 16 is small, and the moisture adsorbing unit 16 exhibits adsorption reaction to high-humidity air (with relative humidity of 70% or higher, for example). It is further assumed that, in the second operation mode, the amount of moisture retained by the moisture adsorbing unit 16 is large, and the moisture adsorbing unit 16 exhibits desorption reaction to low-humidity air (with relative humidity of 60% or lower, for example). In the second operation mode, the operation varies depending on whether frost is formed on the first heat exchanger 11a and the second heat exchanger 11b. Therefore, FIG. 6 illustrates an operation in the case of no frost formation, and FIG. 7 illustrates an operation in the case of frost formation.

<Dehumidifying Operation in First Operation Mode>

A dehumidifying operation in the first operation mode will be described based on FIG. 5. In FIG. 5, (1-1) to (1-5) illustrating states of air are inflowing air in the first operation mode (1-1), air having passed through the first heat exchanger 11a (1-2), air having passed through the moisture adsorbing unit 16 (1-3), air having passed through the second heat exchanger 11b (1-4), and air having passed through the third heat exchanger 11c (1-5).

As described above, in the first operation mode, the third heat exchanger 11c acts as a condenser, the second heat exchanger 11b acts as a condenser, and the first heat exchanger 11a acts as an evaporator.

In the first operation mode of the dehumidifying apparatus 100, introduced air introduced from the inlet portion of the air passage (1-1) is sent into the first heat exchanger 11a. Herein, the introduced air is cooled by the first heat exchanger 11a functioning as an evaporator. When the introduced air is cooled to or below the dew-point temperature, the introduced air is dehumidified with moisture removed therefrom (1-2), and is sent into the moisture adsorbing unit 16. The cooled and dehumidified air has high relative humidity of approximately 80% RH to approximately 90% RH. Thus, the adsorbent material of the moisture adsorbing unit 16 is likely to adsorb moisture.

The cooled introduced air is dehumidified with moisture thereof adsorbed by the adsorbent material of the moisture adsorbing unit 16, and flows into the second heat exchanger 11b as high-temperature, low-humidity air (1-3). Since the second heat exchanger 11b serves as a condenser, the introduced air flowing into the second heat exchanger 11b is heated, increasing the temperature of passing air (1-4). The air having passed through the second heat exchanger 11b flows into the third heat exchanger 11c. The third heat exchanger 11c serves as a condenser and thus increases the temperature of the passing air flowing into the third heat exchanger 11c (1-5), and the passing air is discharged from an outlet portion of the air passage.

<Dehumidifying Operation in Second Operation Mode>

A dehumidifying operation in the second operation mode will be described based on FIGS. 6 and 7. In FIGS. 6 and 7, (2-1) to (2-5) illustrating states of air are inflowing air in the second operation mode (2-1), air having passed through the first heat exchanger 11a (2-2), air having passed through the moisture adsorbing unit 16 (2-3), air having passed through the second heat exchanger 11b (2-4), and air having passed through the third heat exchanger 11c (2-5).

As described above, in the second operation mode, the third heat exchanger 11c acts as a condenser, the second heat exchanger 11b acts as an evaporator, and the first heat exchanger 11a acts as a condenser.

The operation in the case of no frost formation will first be described based on FIG. 6.

In the second operation mode of the dehumidifying apparatus 100, the introduced air introduced from the inlet portion of the air passage (2-1) is sent into the first heat exchanger 11a. Herein, the introduced air is heated by the first heat exchanger 11a functioning as a condenser. The passing air temperature of the introduced air is increased by the first heat exchanger 11a (2-2), and the introduced air is sent into the moisture adsorbing unit 16. In this process, the relative humidity of the heated air is lower than that of the inflowing air. Therefore, the adsorbent material of the moisture adsorbing unit 16 is likely to desorb moisture.

The heated air is humidified with moisture desorbed thereto by the adsorbent material of the moisture adsorbing unit 16, and flows into the second heat exchanger 11b as low-temperature, high-humidity air (2-3). The second heat exchanger 11b serves as an evaporator, and thus cools the passing air flowing into the second heat exchanger 11b. When the passing air is cooled to or below the dew-point temperature by the second heat exchanger 11b, the passing air is dehumidified with moisture removed therefrom (2-4). The air having passed through the second heat exchanger 11b flows into the third heat exchanger 11c. The third heat exchanger 11c serves as a condenser and thus increases the temperature of the passing air flowing into the third heat exchanger 11c (2-5), and the passing air is discharged from the outlet portion of the air passage.

The operation in the case of frost formation will now be described based on FIG. 7. Herein, frost formation refers to frost formation occurring in the first heat exchanger 11a.

In the second operation mode of the dehumidifying apparatus 100, the introduced air introduced from the inlet portion of the air passage (2-1) is sent into the first heat exchanger 11a. Since frost is formed on the first heat exchanger 11a, defrosting is performed in the first heat exchanger 11a, which serves as a condenser. As for the temperature of the air having passed through the first heat exchanger 11a, the air is increased in relative humidity during the defrosting (2-2), and is sent into the moisture adsorbing unit 16. In this process, the temperature of the air changes in accordance with the temperature and humidity of the inflowing air and the state of defrosting.

Then, the air flows into the moisture adsorbing unit 16. Due to the high relative humidity of the air, however, the adsorbent material of the moisture adsorbing unit 16 is less likely to desorb moisture than in the case of no frost formation (adsorption and desorption reaction changes with the passage of time). The air having passed through the moisture adsorbing unit 16 flows into the second heat exchanger 11b (2-3). The second heat exchanger 11b serves as an evaporator, and thus cools the passing air. When the passing air is cooled to or below the dew-point temperature by the second heat exchanger 11b, the passing air is dehumidified with moisture removed therefrom (2-4). The air having passed through the second heat exchanger 11b flows into the third heat exchanger 11c. The third heat exchanger 11c serves as a condenser and thus raises the temperature of the passing air to (2-5), and the passing air is discharged from the outlet portion of the air passage.

<<Specifications and Performance of Heat Exchangers>>

Figure 8:
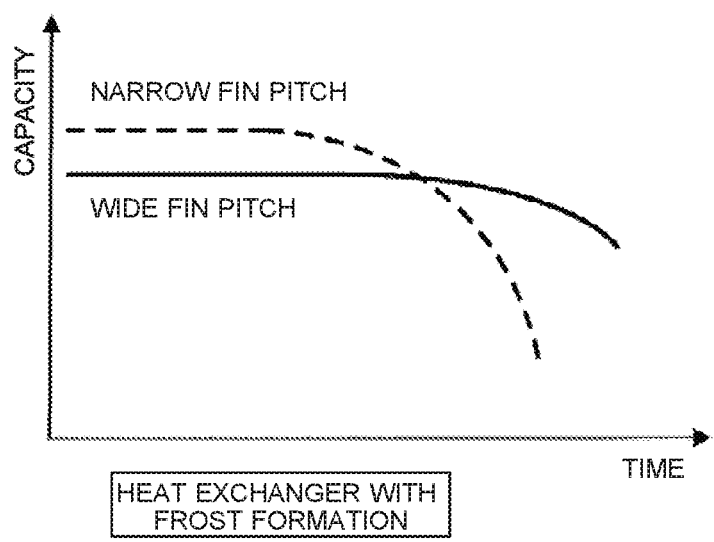
FIG. 8 is a graph illustrating the relationship between a fin pitch and capacity in consideration of frost formation at an ambient temperature of 10 degrees Celsius under a condition in which heat exchangers have the same ventilation area.
Figure 9:
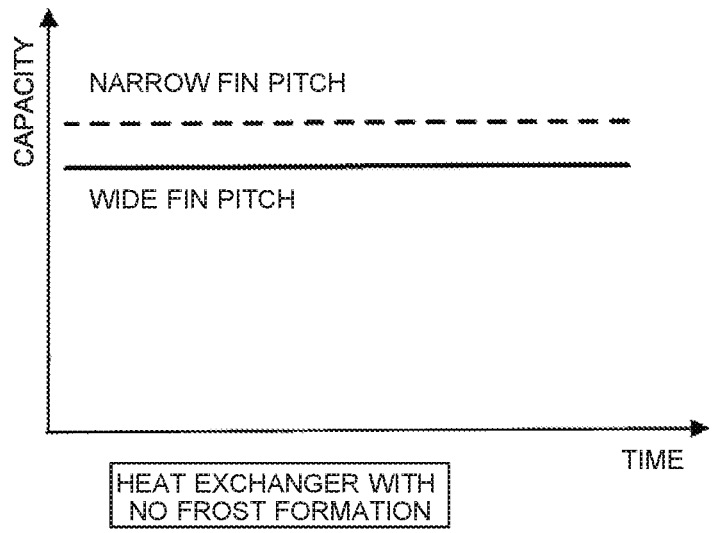
FIG. 9 is a graph illustrating the relationship between the fin pitch and capacity not in consideration of frost formation at the ambient temperature of 10 degrees Celsius under a condition in which heat exchangers have the same volume.

Specifications and performance of heat exchangers will be described here. FIG. 8 is a graph illustrating the relationship between a fin pitch and the performance in consideration of frost formation at an ambient temperature of 10 degrees Celsius under a condition in which heat exchangers have the same ventilation area. FIG. 9 is a graph illustrating the relationship between the fin pitch and the performance not in consideration of frost formation at the ambient temperature of 10 degrees Celsius under a condition in which heat exchangers have the same volume. In FIGS. 8 and 9, the vertical axis and the horizontal axis represent the performance and the time, respectively.

Performance Q of a heat exchanger is expressed as follows.

$$Q = K \cdot A \cdot \Delta T$$

K: the heat transfer rate (a constant determined by factors such as refrigerant and the amount of air to represent the transferability of the heat of refrigerant and air)

A: the heat transfer area of the heat exchanger $\Delta T$: the difference in temperature between refrigerant and air Under a condition in which air conditions, refrigerant conditions, and the amount of air are constant, a heat exchanger with a larger heat transfer area has higher performance Q owing to the larger value of A. Further, the heat exchangers employ the fin-and-tube system, as described above. If the heat exchangers are set to have the same volume, the number of fins may be increased to increase the heat transfer area. The increase in the number of fins results in a reduction in the pitch between the fins (hereinafter referred to as the fin pitch), and the performance is improved while the heat transfer area is secured.

Meanwhile, under the condition with frost formation, frost formation may cause blockage of the spaces between the fins and a reduction in the air amount, thereby reducing K and degrading the performance. As for the heat exchanger with frost formation, therefore, the number of fins, that is, the fin pitch needs to be determined with overall examination of the performance of the heat exchanger when frost is formed thereon and the performance of the heat exchanger when frost is not formed thereon. In the dehumidifying apparatus 100, the first heat exchanger 11a serves as a cooler (evaporator) in the first operation mode, and the second heat exchanger 11b serves as a cooler (evaporator) in the second operation mode. For both of the first heat exchanger 11a and the second heat exchanger 11b, therefore, it is necessary to set the fin pitch in consideration of frost formation.

As an example of the fin pitch in consideration of frost formation, the fin pitch may preferably be set to approximately 2.1 mm to approximately 4 mm in an environment in which the ambient temperature is equal to or higher than 0 degrees Celsius. The heat exchangers are configured to have the same ventilation area to exhibit the performance thereof within a limited space of the heat exchangers. This is related to the degree of installation freedom at the site of a user and unit costs. As illustrated in FIG. 8, in an initial phase with no frost formation, a heat exchanger with a smaller fin pitch has higher performance owing to the larger value of A. As the heat exchanger continues to operate, however, an air passage blockage rate is increased by frost formation, thereby reducing the air amount and K and thus degrading the capacity. The defrosting operation starts when the frost formation has progressed to some extent. The fin pitch is selected in consideration of accumulated capacity up to the start of the defrosting operation.

Meanwhile, the third heat exchanger 11c constantly serves as a condenser, and thus frost formation is unlikely to occur therein. That is, there is no reduction in K due to frost formation, and the third heat exchanger 11c is capable of exhibiting constant performance when the conditions of the air and the refrigerant are constant. Unlike the first heat exchanger 11a and the second heat exchanger 11b in which frost formation may occur, the third heat exchanger 11c is capable of continuously exhibiting high performance during the operation thereof with a reduction in the fin pitch and an increase in the heat transfer area, as understood from FIG. 9. For a heat exchanger with no possibility of frost formation, the fin pitch may preferably be set to approximately 1.5 mm to approximately 2 mm, for example, without consideration of frost formation.

That is, in the dehumidifying apparatus 100, it is possible to reduce the fin pitch of the third heat exchanger 11c, which constantly serves as a condenser, as compared with the first heat exchanger 11a and the second heat exchanger 11b, each of which may serve as a cooler. When a heat exchanger with a fin pitch of 4 mm and a heat exchanger with a fin pitch of 2 mm have the same heat exchanger volume, the heat exchangers have a two-fold difference in the number of fins. As for the influence on the performance Q of the heat exchangers, the performance Q is doubly improved if the other conditions (K and $\Delta T$) are constant.

Further, as well as the increase in the fin pitch, an increase in the number of tubes in the height direction of the heat exchanger similarly improves the performance of the heat exchanger. To increase the number of tubes in a unit in which the space for installing the heat exchanger is fixed, it is necessary to reduce the pitch of rows of tubes in the height direction (hereinafter referred to as the row pitch). The reduction in the row pitch increases the heat transfer area A, and thus improves the initial performance. With the reduction in the row pitch, however, the unit dimension of the spaces between the tubes in the row direction is reduced. When frost formation occurs, therefore, the air passage blockage rate is increased, promoting the deterioration of the performance. This is similar to the case of the small fin pitch.

Meanwhile, as for the heat exchanger with no possibility of frost formation, the heat exchanger having a small row pitch and being capable of securing a large heat transfer area A in the same necessary space constantly exhibits high performance during the operation. This is similar to the above-described case of the fin pitch. In the dehumidifying apparatus 100, therefore, the row pitch of the third heat exchanger 11c with no possibility of frost formation is smaller than that of the first heat exchanger 11a and the second heat exchanger 11b with the possibility of frost formation.

Further, an increase in the number of tubes of the heat exchanger in the depth direction of the air passage similarly improves the performance. To increase the number of tubes in the unit in which the space for installing the heat exchanger is fixed, it is necessary to reduce the pitch between columns of tubes in the depth direction of the air passage (hereinafter referred to as the column pitch). The reduction in the column pitch increases the heat transfer area A, and thus improves the initial performance. With the reduction in the column pitch, however, the unit dimension of the spaces between the tubes in the column direction is reduced. When frost formation occurs, therefore, the air passage blockage rate is increased, promoting the deterioration of the performance. This is similar to the case of the small fin pitch.

Meanwhile, as for the heat exchanger with no possibility of frost formation, the heat exchanger having a small column pitch and being capable of securing a large heat transfer area A in the same necessary space constantly exhibits high performance during the operation. This is similar to the above-described case of the fin pitch. In the dehumidifying apparatus 100, therefore, the column pitch of the third heat exchanger 11c with no possibility of frost formation is smaller than that of the first heat exchanger 11a and the second heat exchanger 11b with the possibility of frost formation.

Further, there is a certain degree of correlation between the column pitch, the row pitch, and the outer diameter of the heat transfer tube, that is, the cross section of the passage to exhibit the performance of the heat exchanger. If the row pitch and the column pitch are increased, the heat transferred from the heat transfer tube to the fins is reduced. It is therefore preferable to use a heat transfer tube greater in outer diameter than that of the heat exchanger with a smaller row pitch and a small column pitch, to thereby increase the area of contact between the heat transfer tube and the fins and ensure the heat transfer amount.

In the dehumidifying apparatus 100, the size of the heat transfer tube, the row pitch, and the column pitch may preferably be set as follows, for example. The diameter of the heat transfer tube may preferably be set to approximately 9.52 in the first heat exchanger 11a and the second heat exchanger 11b and approximately 8 in the third heat exchanger 11c. In the first heat exchanger 11a and the second heat exchanger 11b, the row pitch may preferably be set to approximately 25.4, and the column pitch may preferably be set to approximately 22. The column pitch of the first heat exchanger 11a and the second heat exchanger 11b may preferably be set to approximately 22, and the column pitch of the third heat exchanger 11c may preferably be set to approximately 17.7.

<<Effects of Dehumidifying Apparatus 100>>

Changing the fin pitch, the row pitch, the column pitch, and the diameter of the heat transfer tube of the heat exchanger depending on the occurrence or non-occurrence of frost formation particularly enables a reduction in the size and cost of the third heat exchanger 11c. In the dehumidifying apparatus 100 using the adsorbent material and the cooling system, the third heat exchanger 11c is installed separately from the first heat exchanger 11a and the second heat exchanger 11b to realize high performance. Although the space of the unit may be increased owing to the addition of the third heat exchanger 11c, it is possible to minimize the increase in cost and size by lowering the specifications of the additional third heat exchanger 11c.

Embodiment 2

Figure 10:
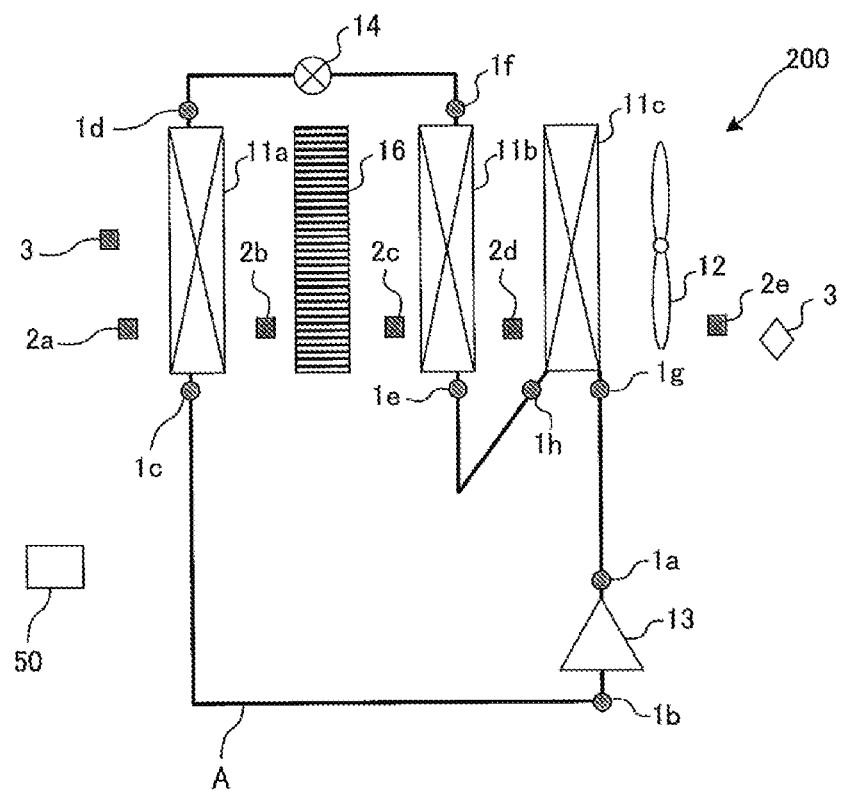
FIG. 10 is a schematic diagram illustrating an example of the configuration of a dehumidifying apparatus according to Embodiment 2 of the present invention.

FIG. 10 is a schematic diagram illustrating an example of the configuration of a dehumidifying apparatus 200 according to Embodiment 2 of the present invention. The dehumidifying apparatus 200 will be described based on FIG. 10. A basic configuration of the dehumidifying apparatus 200 is similar to the configuration of the dehumidifying apparatus 100 according to Embodiment 1. Further, in Embodiment 2, a description will focus on differences from Embodiment 1. The same parts as those of Embodiment 1 will be assigned with the same reference signs, and a description thereof will be omitted.

In Embodiment 1, a description has been given of the configuration in which a device such as the four-way valve 15 is used to switch the refrigerant flowing into the first heat exchanger 11a or the second heat exchanger 11b, to thereby perform the adsorption and desorption of the moisture adsorbing unit 16 without changing the airflow. Meanwhile, in Embodiment 2, a description will be given of a configuration in which the air passage is switched without switching of the refrigerant circuit to perform a similar operation. That is, the dehumidifying apparatus 200 according to Embodiment 2 is not provided with the refrigerant circuit switching unit such as the four-way valve 15. Components are similar to those of Embodiment 1, and thus a description thereof will be omitted here.

<First Operation Mode: Adsorption>

In the first operation mode, the air has the changes in temperature and humidity in FIG. 5 similarly as in the dehumidifying apparatus 100 according to Embodiment 1. In the first operation mode of the dehumidifying apparatus 200, the introduced air introduced from the inlet portion of the air passage (1-1) is sent into the first heat exchanger 11a. Herein, the introduced air is cooled by the first heat exchanger 11a functioning as an evaporator. When the introduced air is cooled to or below the dew-point temperature, the introduced air is dehumidified with moisture removed therefrom (1-2), and is sent into the moisture adsorbing unit 16. The cooled and dehumidified air has high relative humidity of approximately 80% RH to approximately 90% RH. Thus, the adsorbent material of the moisture adsorbing unit 16 is likely to adsorb moisture.

The cooled introduced air is dehumidified with moisture thereof adsorbed by the adsorbent material of the moisture adsorbing unit 16, and flows into the second heat exchanger 11b as high-temperature, low-humidity air (1-3). The second heat exchanger 11b serves as a condenser and thus heats the introduced air flowing into the second heat exchanger 11b, and increases the temperature of the passing air (1-4). The air having passed through the second heat exchanger 11b flows into the third heat exchanger 11c. The third heat exchanger 11c serves as a condenser and thus increases the temperature of the passing air flowing into the third heat exchanger 11c (1-5), and the passing air is discharged from the outlet portion of the air passage.

<Second Operation Mode: Desorption>

In the second operation mode, the temperature and humidity of the air change as follows. In the second operation mode of the dehumidifying apparatus 200, the introduced air introduced from the inlet portion of the air passage is sent into the second heat exchanger 11b. Herein, the introduced air is heated by the second heat exchanger 11b functioning as a condenser. The passing air temperature of the introduced air is increased by the second heat exchanger 11b, and the introduced air is sent into the moisture adsorbing unit 16. In this process, the relative humidity of the heated air is lower than that of the inflowing air. Therefore, the adsorbent material of the moisture adsorbing unit 16 is likely to desorb moisture.

The heated air is humidified with moisture desorbed thereto by the adsorbent material of the moisture adsorbing unit 16, and flows into the first heat exchanger 11a as low-temperature, high-humidity air. The first heat exchanger 11a serves as an evaporator, and thus cools the passing air flowing into the first heat exchanger 11a. When the passing air is cooled to or below the dew-point temperature by the first heat exchanger 11a, the passing air is dehumidified with moisture removed therefrom. The air having passed through the first heat exchanger 11a flows into the third heat exchanger 11c. The third heat exchanger 11c serves as a condenser and thus increases the temperature of the passing air flowing into the third heat exchanger 11c, and the passing air is discharged from the outlet portion of the air passage.

<Third Operation Mode: Defrosting>

Even if frost is formed on the first heat exchanger 11a that constantly serves as a cooler in the first operation mode or the second operation mode, the dehumidifying apparatus 200 does not switch the refrigerant circuit. The dehumidifying apparatus 200, therefore, performs a so-called off-cycle defrosting operation, which is defrosting of stopping the operation of the refrigeration cycle and supplying ambient air to the frosted heat exchanger to thereby melt frost.

Also in the dehumidifying apparatus 200 that performs the off-cycle defrosting operation, there is no need to take into account frost formation for the second heat exchanger 11b and the third heat exchanger 11c, each of which only serves as a condenser, not functioning as a cooler, similarly as in the dehumidifying apparatus 100 according to Embodiment 1. Therefore, the second heat exchanger 11b and the third heat exchanger 11c may preferably be reduced in size.

To switch the air passage, the air passage may preferably be provided with a device such as a damper or a shutter to allow air to be supplied to the first heat exchanger 11a or the second heat exchanger 11b.

<<Effects of Dehumidifying Apparatus 200>>

Changing the fin pitch, the row pitch, the column pitch, and the diameter of the heat transfer tube of the heat exchanger depending on the occurrence or non-occurrence of frost formation particularly enables a reduction in the size and cost of the third heat exchanger 11c. In the dehumidifying apparatus 200 using the adsorbent material and the cooling system, the third heat exchanger 11c is installed separately from the first heat exchanger 11a and the second heat exchanger 11b to realize high performance. Although the space of the unit may be increased owing to the addition of the third heat exchanger 11c, it is possible to minimize the increase in cost and size by lowering the specifications of the additional third heat exchanger 11c. Further, in the dehumidifying apparatus 200, the second heat exchanger 11b also constantly serves as a condenser. It is therefore possible to lower the specifications of the second heat exchanger 11b similarly to those of the third heat exchanger 11c.

REFERENCE SIGNS LIST 1a discharge temperature sensor 1b suction temperature sensor 1c temperature sensor 1d temperature sensor 1e temperature sensor 1f temperature sensor 1g temperature sensor 1h temperature sensor 2a thermo-hygro sensor 2b thermo-hygro sensor 2c thermo-hygro sensor 2d thermo-hygro sensor 2e thermo-hygro sensor 3 air amount detecting unit 4 counter 11a first heat exchanger 11b second heat exchanger 11c third heat exchanger 12 air sending unit 13 compressor 14 expansion unit 15 four-way valve 16 moisture adsorbing unit 50 control circuit 100 dehumidifying apparatus 101 refrigerant passage 102 refrigerant passage 200 dehumidifying apparatus A refrigerant circuit

The invention claimed is:

1. A dehumidifying apparatus comprising:
   a first heat exchanger disposed in an air passage to serve as a condenser or an evaporator;
   a second heat exchanger disposed in the air passage to serve as an evaporator or a condenser;
   a third heat exchanger disposed in the air passage to serve as a condenser;
   moisture adsorbing material disposed between the first heat exchanger and the second heat exchanger in the air passage to adsorb moisture from air having high relative humidity and desorb moisture to air having low relative humidity;
   a fan configured to cause air to pass through the first heat exchanger, the moisture adsorbing material, the second heat exchanger, and the third heat exchanger in this order;
   a compressor having a discharge side connected to the third heat exchanger; and
   an expansion valve configured to reduce pressure of refrigerant condensed by the first heat exchanger or the second heat exchanger,
   wherein each of the first heat exchanger, the second heat exchanger, and the third heat exchanger is a fin-and-tube heat exchanger,
   wherein the third heat exchanger has a fin pitch smaller than a fin pitch of the first heat exchanger and a fin pitch of the second heat exchanger, and
   wherein the third heat exchanger is smaller in size than the first heat exchanger and the second heat exchanger.

2. The dehumidifying apparatus of claim 1, further comprising a refrigerant circuit switching valve configured to allow the first heat exchanger and the second heat exchanger to serve as a condenser and an evaporator, respectively, or to serve as an evaporator and a condenser, respectively,
   wherein the refrigerant circuit switching valve is configured to switch between forming a first refrigerant passage and forming a second refrigerant passage,
   wherein the first refrigerant passage allows the refrigerant to circulate through the compressor, the third heat exchanger, the second heat exchanger, the expansion valve, and the first heat exchanger in this order, and
   wherein the second refrigerant passage allows the refrigerant to circulate through the compressor, the third heat exchanger, the first heat exchanger, the expansion valve, and the second heat exchanger in this order.

3. A dehumidifying apparatus comprising:
   a first heat exchanger disposed in an air passage to serve as an evaporator;
   a second heat exchanger disposed in the air passage to serve as a condenser;
   a third heat exchanger disposed in the air passage to serve as a condenser;
   moisture adsorbing material disposed between the first heat exchanger and the second heat exchanger in the air passage to adsorb moisture from air having high relative humidity and desorb moisture to air having low relative humidity;
   a fan configured to cause air to pass through the first heat exchanger, the moisture adsorbing material, the second heat exchanger, and the third heat exchanger in this order, or to cause air to pass through the second heat exchanger, the moisture adsorbing material, the first heat exchanger, and the third heat exchanger in this order;
   a compressor having a discharge side connected to the third heat exchanger; and
   an expansion valve configured to reduce pressure of refrigerant condensed by the third heat exchanger and the second heat exchanger,
   wherein each of the first heat exchanger, the second heat exchanger, and the third heat exchanger is a fin-and-tube heat exchanger,
   wherein the third heat exchanger has a fin pitch smaller than a fin pitch of the first heat exchanger and the second heat exchanger has a fin pitch smaller than the fin pitch of the first heat exchanger, and
   wherein the third heat exchanger and the second heat exchanger are smaller in size than the first heat exchanger.

* * * * *